Jan. 5, 1932.    D. D. SHELTON    1,839,443
RETORT
Filed July 25, 1927    5 Sheets-Sheet 1

Inventor
Donald D. Shelton
By Thomas Bilger
Attorney

Jan. 5, 1932.  D. D. SHELTON  1,839,443
RETORT
Filed July 25, 1927   5 Sheets-Sheet 2

Fig. 4

Inventor
Donald D. Shelton
By Thomas Bilyeu
Attorney

Patented Jan. 5, 1932

1,839,443

UNITED STATES PATENT OFFICE

DONALD D. SHELTON, OF PORTLAND, OREGON

RETORT

Application filed July 25, 1927. Serial No. 208,371.

My present invention relates to my United States patent application, Serial Number 148,446 filed November 15, 1926, and to my method patent for the carbonizing of materials at relatively low temperatures, filed July 25, 1927, Serial Number 208,370.

My present invention relates to retorts and consists primarily of a masonry structure in which is disposed a furnace and an upright rectangular retort, the furnace heat entering the retort at or near the top of the same and the heat stream passing downward through a central passageway disposed within the retort. Means being provided for the passing of the materials to be treated through the retort and past the side walls of the same. The heat for carbonization and distillation passing through the walls of the retort into the material, the mass being continuously fed therethrough. I have provided means for predetermining the thickness of the stream mass and for the periodic agitation and the separation of the stream into distinct sections for momentary periods. Means is also provided for the cooling of the carbonized residue, before the same is finally discharged from the base of the device. This cooling is accomplished by passing the carbon particles over a cooling drum in a thin stream and the depositing of the same in a bin or hopper that is disposed within the base, the outer surfaces of which are wholly or partially covered with a cooling jacket having a cooling medium surrounding the same. Means is further provided for the cooling of the volatiles that are delivered into a condensing chamber whereby the volatiles are delivered into the condensing chamber and a partial separation of the same is accomplished and the solids precipitated therein are deposited and removed from the base of the condensing chamber. A multiple of reservoirs are provided for within the base of the condensing chamber and at different elevations. Means is further provided for the depositing of the carbonized elements within the base of the retort and for the cooling of the same during deposit within the base and for cooling the same after deposit therein.

And still further objects of my invention consist in means being provided for the application of heat to the side walls of the retort chamber and to the broad side of the mass being passed therethrough, but means is also provided for the application of heat to each edge of the stream mass being passed through the retort.

Still additional objects of my invention consist in providing means for spraying the condensed material into the condensing chamber for condensing the gases passing therethrough.

Still further objects of my invention consist in providing within the base of the retort a cooling chamber, and providing means for the cooling of the carbonized material during the passage of the same from the passageways where the carbonizing has occurred and providing additional cooling means for the further cooling of the carbonized products within the base before the same have been delivered therefrom through a screw conveyor disposed at the lowest point within the base for maintaining the carbonized products therein.

And still additional objects of my invention consist in providing a multiple of condensed liquid holding wells disposed at the base of each condenser, each being at a different elevation, and in the further provision that each of the liquid holding wells acts as a seal for the base of the condensing chamber.

And still further objects of my invention consist in providing suitable means for the liberation of the volatiles driven off at fairly low temperatures being passed into the condenser at the top of the same and the delivery of such low temperature volatiles into a second condenser, thus separating the volatiles into the adjacent condenser, thereby effecting a substantial separation of the volatiles into groups and the simplifying of the by-product recoveries.

And further primary objects of my present invention is the carbonizing of the comminuted products of our sawmills, factories, mines and the like at relatively low temperatures.

Further objects of my invention consist in providing means for the carbonizing of comminuted products at relatively low temperatures, in commercial quantities and in the further providing of suitable means adapted to the recovery of the carbonized products and in the separation and recovery of the volatile content of the mass being treated.

Still further objects of my invention consist in providing means for the continuous handling of the mass to be treated and the recovery of the valuable content of the same in the form of solids, liquids, and gases and the separation of each from the other.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Like reference characters refer to like parts throughout the several views.

The device in the illustrative form of embodiment, disclosed herein, is designed more especially for use in the carbonizing of comminuted saw mill waste and allied products and the device is admirably adapted for the treatment of such products continuously in commercial quantities. However, certain features of the device, as herein illustrated, are applicable in the treatment of other comminuted products and the recovery of the volatile content thereof, such as coal, peat, oil shale,—the treatment of certain ores and other mine commodities.

The accompanying drawings show the invention in preferred form adapted to the particular requirements of comminuted saw mill waste; but it is intended to be understood that it is not intended to limit the invention to such use, as it is well adapted for use in analogous lines and for analogous purposes.

Described in general terms, the invention may be divided into a furnace, preferably horizontal, disposed and made of masonry, into which solid, or liquid, or gaseous fuel may be burned for the generating of heat for carbonizing and volatilizing the products to be treated. A masonry superstructure at one end of the furnace is adapted to convey the heat from the furnace through suitable stacks and deliver the same into a vertically disposed retort positioned within the masonry structure, rectangular in form, and having side walls, preferably made of cast iron, through which side walls the heat flows for carbonizing and volatilizing purposes. A stream of the mass to be treated is passed downwardly, at the outer side of each of the side walls which are preferably made smooth on the outside against the smooth side of which the mass is fed. Means being provided for agitating the mass on its downward flow and for feeding the same and for the liberating of the volatile content from the mass. The volatile content is passed into a condensing chamber rearwardly disposed from the retort chamber. Means being provided for limiting or predetermining the thickness of the stream of the mass being treated and also for predetermining the amount of agitation of the same. Means being further provided within the condensing chamber for dividing the same into a multiple of chambers, having cooling elements disposed within the condensing chamber and for drawing off the precipitated elements deposited within the base of each of the compartments of the condensing chamber. Means being provided for finally depositing the residue of the carbonized materials disposed within the base at the bottom of the furnace. The cooling of the residue and the final discharging of the same therefrom, therefore, my device in its preferred embodiment consists of a furnace, a retort chamber through which the heat is passed, channels through which the mass to be treated flows, condensing chambers and a cooling base.

Described in general terms, the device consists of a furnace 1, having an inlet door 2, through which the fuel may be fed to the interior of the furnace 1. A stack 3 is disposed upon the furnace and delivers the heat from the furnace into the central passageway of the furnace structure the same being deposited through the opening 4. The heat is then passed downward through the central passageway. The mass to be treated is deposited within the upper end of the furnace through any suitable means, as through a feeding chute 5, and is deposited within the chamber 6, disposed in the upper end of the furnace. In order to divide the stream flow of material and distribute the same a V shaped bottom 7 is disposed within the chamber 6, the slope of the bottom being sufficient to facilitate the downward feeding of the mass therealong. Agitating and feeding elements 8 are disposed at either side of the chamber 6 and similar elements 9 are disposed at either side of the V shaped bottom 9, with means for imparting a periodic up and down movement to each of the feeding elements to facilitate an even flow of the mass to be treated into the carbonizing and volatilizing passageways 10 and 11, one each being disposed at either side of the furnace. The retort is preferably composed of side walls of cast iron, though burned fire clay and other suitable elements may be used, which are smooth on the outside to permit of a free flowing of the materials theredown and therealong; ribs may be formed on the inside of the same to give the side walls strength and to prevent undue warping of the side wall members. The channels 10 and 11, through which the stream mass flows, are adapted to being adjustably positioned in distance from the side walls of the retort to adapt the same to the successful commercial and continuous treatment of the materials being treated.

It is very essential in the operation of a device of this kind and one of the fundamental features of the same, is to confine the depth or thickness of the stream of material to relatively shallow depths to permit of the carbonizing of all of the materials passing therethrough and to permit of the freest liberation of the volatile content from the materials and to prevent any sweating of the mass during treatment.

At the time of the heating of the furnace it may be found desirable to permit the gases from the furnace to pass directly into the outlet stack. This is accomplished by having inlet 4 on the opposite side of the furnace to that of the outlet 12 leading directly into the stack 13 until a sufficient heat has been developed within the furnace and the same has become heated sufficiently for carbonization at which time the damper 14, disposed in the outlet 12 will be closed and the heat will then be required to flow downwardly through the central passageway and will be permitted to flow out at or near the bottom of the central passageway through the outlet 15 disclosed in Fig. 5 and upward through the stack connecting passageway 16. An adjustable damper 17 being disposed within the passageway 16.

Figure 4:
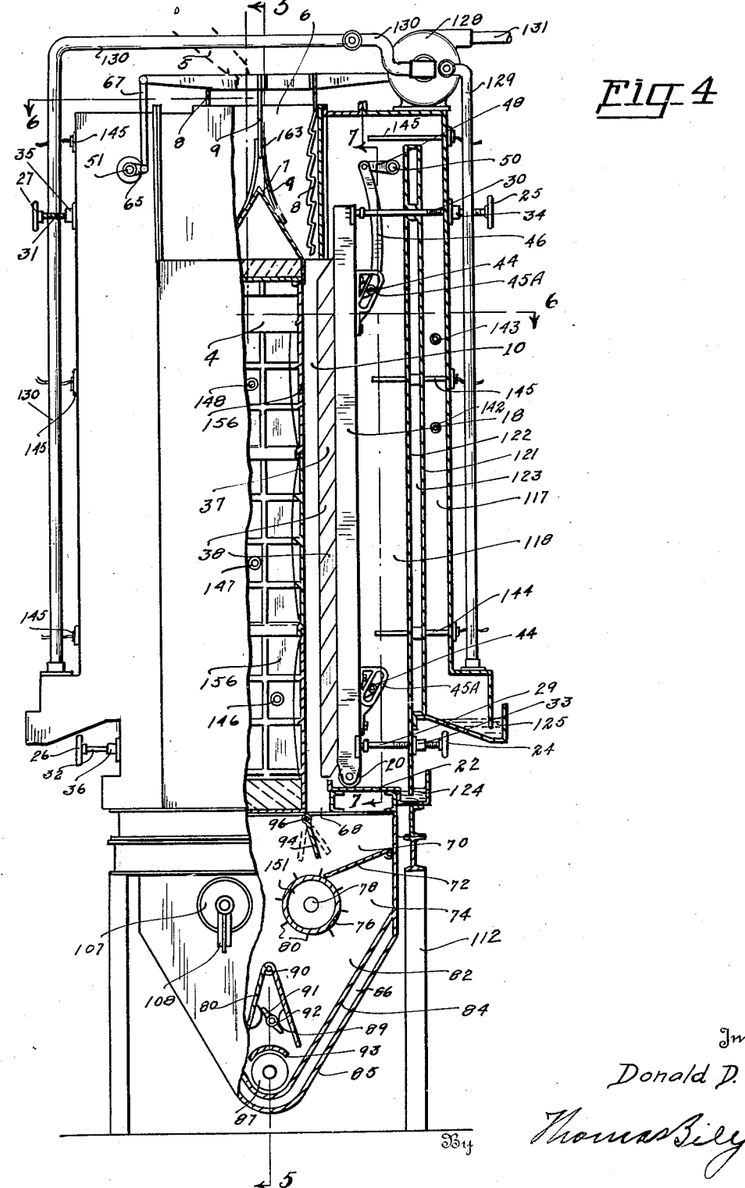
Fig. 4 is a longitudinal, sectional view, of the assembled device, the same being taken on line 4—4 of Fig. 1, looking in the direction indicated.
Figure 8:
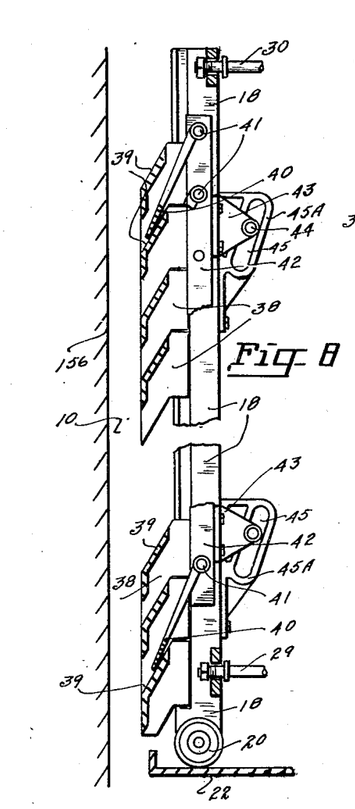
Fig. 8 is a cross section view, taken on line 8—8 of Fig. 7, looking in the direction indicated.
Figures 9, 10:
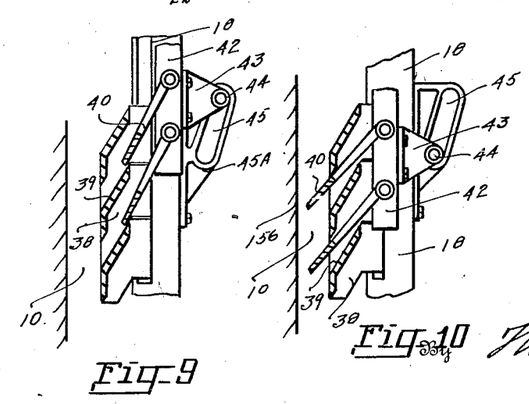
Fig. 9 is a fragmentary, sectional, side elevation of the louvers illustrating the agitating elements in the fully raised or elevated position.
Fig. 10 is a fragmentary, side elevation, of the louvers and the agitating elements shown in the full lowered position.

It is desirable to conserve the heat of the furnace and that the furnace structure, preferably be made of masonry, and that the passageways 3 and 16 be comprised of masonry, as brick or concrete. The louver and agitating elements are carried upon side frames 18 and 19, as illustrated in Fig. 4, wherein the side frames 18 and 19 are carried upon trunnion supporting wheels 20 and 21 disposed upon the lower end of the side frames. The trunnion wheels operate upon shoes 22 and 23 and are adapted to roll thereupon. The trunnion wheels being supported by shafts journaled within the side frames. The distance between the louvered walls carried within the side frames and the heated side walls of the furnace, or retort, may be varied to meet the requirements of the character and kind of material being treated. This is accomplished through hand adjusting wheels 24 and 25, 26 and 27 disposed at either side of the furnace, as illustrated in Fig. 4. The wheels shown are adapted to manual manipulation but the same may be adapted to machine manipulation. When a working space has been created, the same may then be locked in position by the locking nuts 28 placed upon the shafts to which the adjusting hand wheels are secured. The shafts 29 and 30, 31 and 32, are in threaded relationship with suitable collars 33 and 34, 35 and 36, disposed upon the outside of the outer wall of the device. Louvered elements 37 and 38, preferably made of metal, each having a downwardly inclined surface 39, illustrated in detail in Fig. 8, the louvered surfaces being in spaced relationship and substantially horizontal in general alignment having downwardly inclined surfaces 39, against which the agitating blades 40 are made to engage, during the travel of the same. The agitating blades 40 are hinged about supporting pins 41, secured to the side frames 42; each of the side frames 42 being rearwardly disposed relative to the louvered elements, brackets 43 carry shafts 44. Shafts 44 are adapted to engagement with inclined slots or guideways 45, disposed in the bracket 43, and the side frames 42 are in suspended relationship, the same being supported upon links 46 and 47, illustrated in Fig. 4. The links 46 and 47 are in turn supported upon arms 48 and 49 adapted to having alternate directions of movement imparted thereto, through the operations of shafts 50 and 51. As an up and down movement is imparted to the brackets 43 and to the shafts 44 operating within the slots 45, an in and out movement is imparted to the feeding blades 40. In the initial stages of the downward movement of the agitating blades 40, the same contacts with and rides upon the inclined surface 39 of the louvers, but as the same nears the end of the bottom stroke, an upward movement is imparted to the lower end of the agitating blade, as illustrated in Fig. 10, due to the underside 52 of the agitating blade 40 contacting with the upper edge of the agitating blades and thus raises the mass of material disposed upon the upperside of the agitating blades 40. The downward movement of the agitating blades feeds the material downward and at or near the end of the stroke the material is raised, thus completely agitating the mass fed therealong, the object of which is to keep the same in a loose condition, and to permit of the freest possible liberation of the volatile content of the mass. The volatile content flows through and between the louvered surfaces and directly into the condensing chamber disposed adjacent to that of the louvered surfaces.

Figures 1, 2, 3:
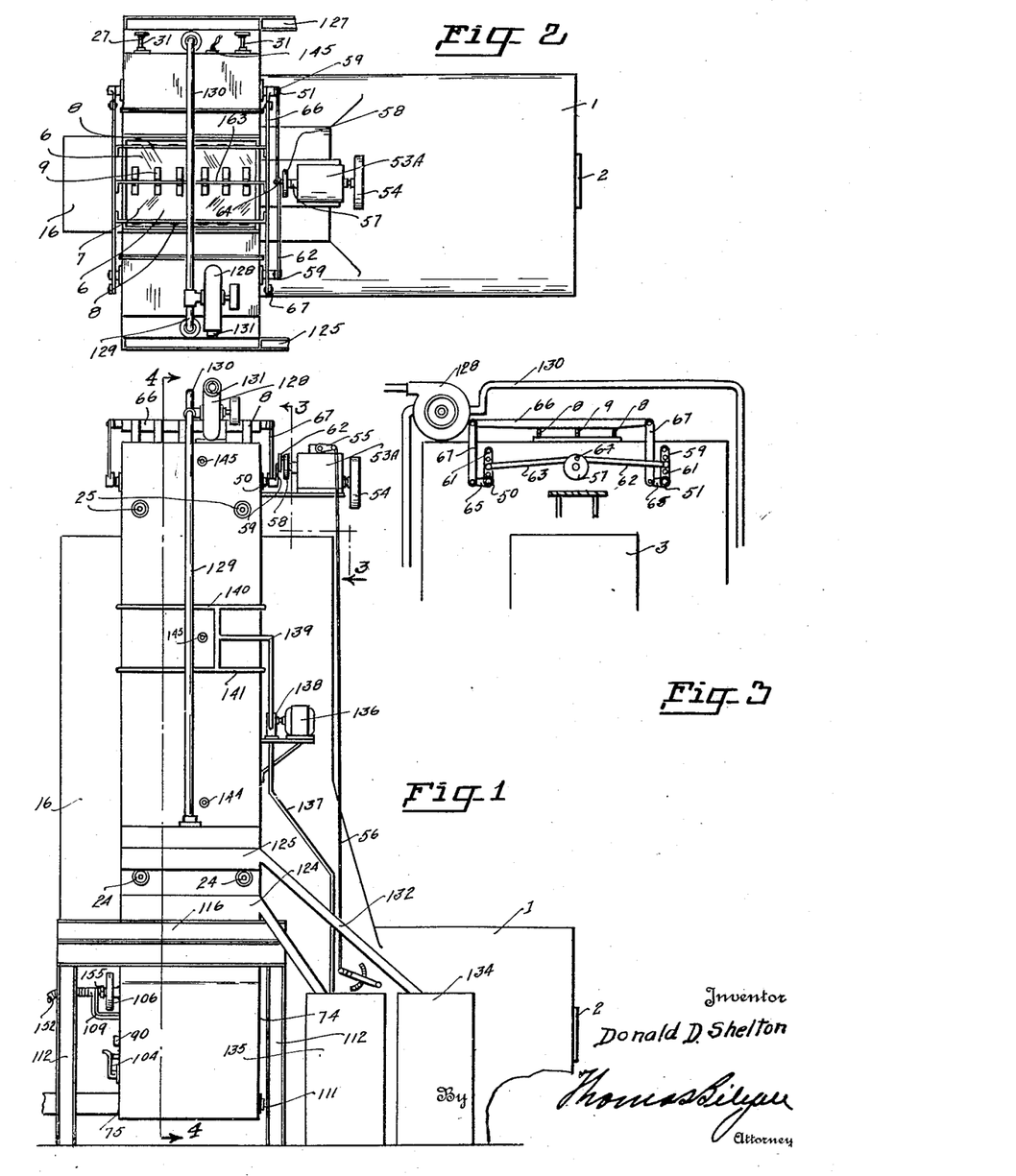
Fig. 1 is the side elevation of the assembled device.
Fig. 2 is a top, plan view, of the mechanism illustrated in Fig. 1.
Fig. 3 is a fragmentary, partial, sectional view, taken on line 3—3 of Fig. 1, looking in the direction indicated.

A speed reducing gear box 53 disposed outside of the retort structure, the same is adapted to being driven by any suitable means, power being applied to the driving element 54 and an actuating lever 55 is disposed upon the casing and manually operated by pull rod 56 which is attached to the operating lever 55 and terminates at a convenient point for manual operation. Shaft 57 runs through the gear box and has attached to the outer end thereof an eccentric disk 58 that is attached to and operates the crank, as illustrated in Fig. 3, and has a series of operating adjusting holes 61 secured therein to which the cross pitman rod 62 and 63 are attached. The wrist pin 64 disposed upon the eccentric disk 58 coacts with the pitman rods 62 and 63 and imparts a rocking motion to each of the bell cranks 59. The distance that the pitman rods engage the bell cranks 59 from their center of oscillation will determine the throw of the oppositely disposed end of the bell crank and therefore the amount of movement of the lever 66, secured thereto through the connecting links 67. The operating lever 66 is attached to the feeding elements 8 and 9 and as an up and down movement is imparted to the lever 66 an up and down movement will be imparted to the feeding elements 8 and 9. Shafts 50 run the full width of the machine to which the operating arm 48 is attached and as an up and down movement is imparted to the cross lever 66, an up and down movement will be imparted, at the same time, through the link 67, to the links 46 and 47 and therefore an up and down movement will be imparted at the same time to the agitating blades 40. The length of stroke of the agitating blades 40 will be predetermined by the positioning of the pitman rods 62 relative to the holes in the one leg of the arm 59 of the bell crank. It will thus be seen that the length of stroke of the agitating blades and the depth of the stream flow of the mass flowing through the device is predetermined by the positioning of the louvered elements relative to the side walls of the retort structure.

The treated mass flowing through the channel passageways 10 and 11 are delivered through the discharge openings 68 and 69, as illustrated in Fig. 4, and is permitted to be deposited within the chambers 70 and 71. The chambers 70 and 71 have, as their bottom surface, hinged elements 72 and 73. The hinged elements 72 and 73 are hinged through their outer ends to the side walls 74 and 75 of the hopper and the inner end of the same rests upon the revolving and cooling drums 76 and 77 are secured to suitable shafts 78 and 79 and are adapted to have a cooling fluid pass therethrough to maintain the same in a cooled operating condition. Outwardly projecting fins 80 and 81 are disposed upon the outer surface of the cooling drums 76 and are adapted to engage the underside of the bottom elements 72 and 73 and to raise the same as the outwardly projecting fins engage the underside thereof and as the same passes the bottom end of the elements, the same is permitted to drop down, thus permitting of a depositing of the carbonized material upon the outer surface of the cooling drum 76 and 77.

As the heated treated materials pass over the cooling drums 76 and 77, the material is released therebetween and is deposited within the hopper 82. The hopper 82 should be made relatively large to permit of a substantial storage of carbonized material therein. The hopper 82 is preferably made having inwardly sloping walls 83 and 84, and is water jacketed on its exterior. This is done by a secondary metal cover 85, thus forming a space 86 therebetween for the passing of a cooling liquid therein. Running longitudinally of the hopper 82 is a screw element 87, the object of which is to eject from the hopper, materials deposited within the bottom of the same. A hinged distributor having hinged side walls 88 and 89 are disposed beneath the cooling drums and is so arranged that the materials falling from the cooling drums fall thereupon. The side walls being hinged about a central shaft 90 and the side walls are adapted to being maintained in predetermined spaced relationship through the operation of a positioning cam 91 disposed about the shaft 92. The shaft 92 extends to the exterior of the hopper and is adapted to manual manipulation. A shield 93 is disposed above the upper surface of the screw element 87, the purpose of which is to prevent the overloading of the screw in its feeding operation and to permit of an orderly and even ejection of the material being deposited thereupon.

Figure 11:
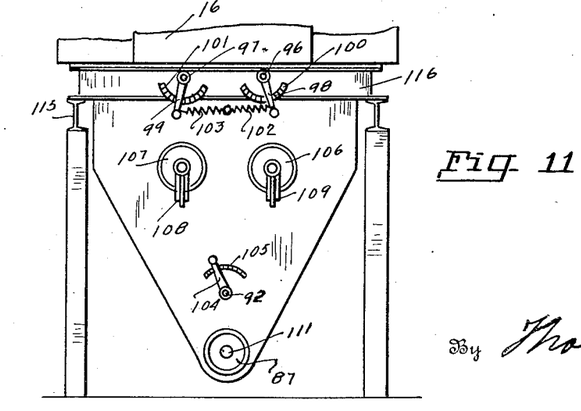
Fig. 11 is a side elevation of the base and discharge hopper of the assembled device.

As the materials are deposited upon the bottom elements 72 and 73 and are fed from the chambers 70 and 71 through the action of the rotation of the cooling drums, the thickness of the stream of the material being removed from the chambers 70 and 71 is predetermined through the positioning of the hinged damper plates 94 and 95. The damper plates 94 and 95 are supported upon rods 96 and 97 that run to the exterior of the hopper and are adapted to manual manipulation, the same being illustrated in detail in Fig. 11. Operating levers 98 and 99 are disposed the outer ends of the rods 96 and 97 and are adapted to engage upon notched quadrants 100 and 101. In the event of an overplus of material being deposited within the chambers 70 and 71 and an undue pressure is developed within the chambers, the damper plates 94 and 95 may be stressed outwardly against the operating springs 102 and 103 until the pressure within the chambers 70 and 71 has become normal and equalized. The operating lever 104, for positioning the elements 88 and 89 mounted upon shaft 90, also coacts with a notched quadrant 105 disposed upon the outer surface of the jacket of the hopper structure. Power for driving the shafts 78 and 79 of the hopper drums, is applied to pulleys 106 and 107 disposes the outer surface of the hopper. Brackets 108 and 109 support the outer ends of the shafts and act as journals therefor. Power from any suitable source, not here shown, may be applied to the pulleys 106 and 107 to impart rotation thereto. A pulley 110 is disposed upon the outer end of the shaft 111 to which the feed screw 87 is secured. Structural legs 112 and 113 act as a support for the main portion of the hopper and for the retort. Cross beams 114 and 115 connect the upper ends of the support columns 112 and 113 upon which a base 116 for the underside of the hopper contacts and upon which the same is superposed.

I preferably form my condensing chambers into a multiple of chambers 117 and 118, and 119 and 120. I have here shown these chambers as being two in number, but I do not wish to be limited to any number of chambers, in each condenser, as the number of condensing chambers will be determined by the character and kind of material being passed through the retort, and the relative volatile content of the mass being passed through the retort. Running longitudinally of the condensing chambers, in preferred embodiment, is a cooling element composed of two side walls 121 and 122 so arranged as to permit of a cooling medium being passed through the space 123 disposed between the side walls. In preferred embodiment, a liquid holding well is disposed at the base of the condensing chambers, as illustrated at 124 and 125, 126 and 127, best illustrated in detail in Fig. 4. The liquid holding wells disposed at either side of the retort being at different elevations and each connecting only with a condensing chamber disposed at either side of the cooling diaphragm, running longitudinally of the condensing chamber.

I have observed that the groups of condensed liquids disposed within each liquid holding well, is composed of different constituent elements, and that where but two liquid holding wells are provided for and one cooling diaphragm runs longitudinally of the condensing chamber, that the condensed material deposited within the well is composed of different constituent elements but wherein a larger number of chambers are disposed within the condenser, that additional groups of constituent elements may be successfully precipitated within the wells.

While I have shown each condensing chamber composed of but two compartments, I do not wish to be limited to but two compartments, as it may be found expedient in the successful treatment of certain materials having a high volatile content and where it is found desirable to separate the elements into more specific groups, to have a multiple of such chambers and liquid holding wells disposed within the condensing chamber.

Disposed adjacent the retort is an exhauster 128 and I have found best results obtain wherein the same is disposed vertically above the condensing chambers in order that the pipes 129 and 130 connecting the exhauster with the base of the condensing chambers may rise substantially vertically therefrom to permit the free drainage of liquids from the elements being pumped through the pipes 129 and 130. The outlet end 131 leading from the exhauster carries the material from the condensing chamber that may be delivered to receiving tanks or to other storage; or the same may be directly delivered to furnaces and the same burned as fuel. Outlet pipes 132 and 133 may be made to deliver the condensible liquids from the liquid holding wells disposed at the base of the condensing chamber and the same be stored within storage tanks 134 and 135.

Figure 6:
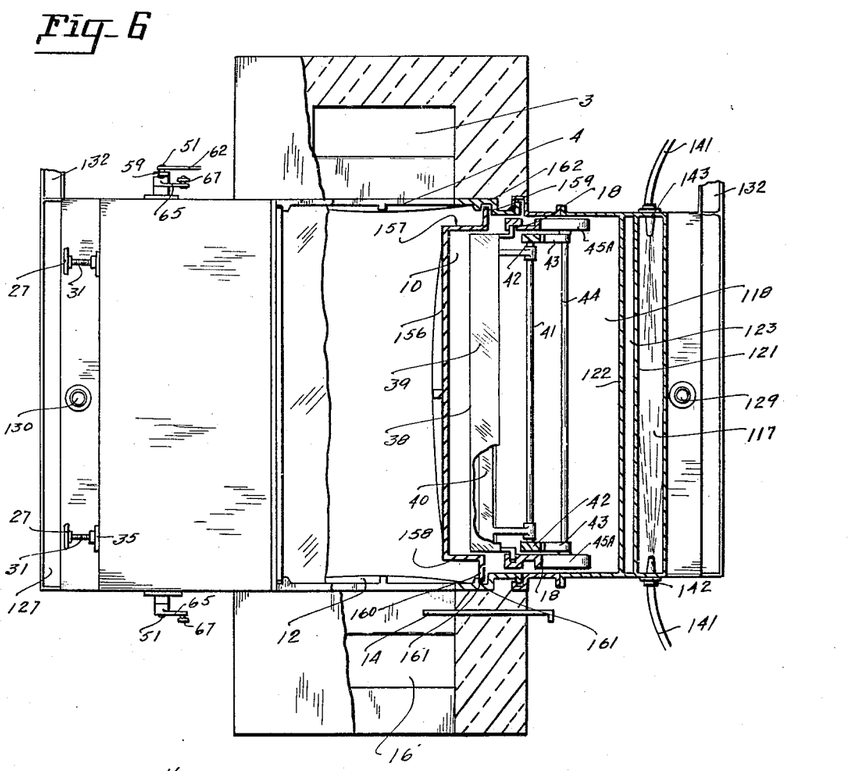
Fig. 6 is a partial, cross, section, of the assembled device, the same being taken on line 6—6 of Fig. 4, looking in the direction indicated.
Figure 7:
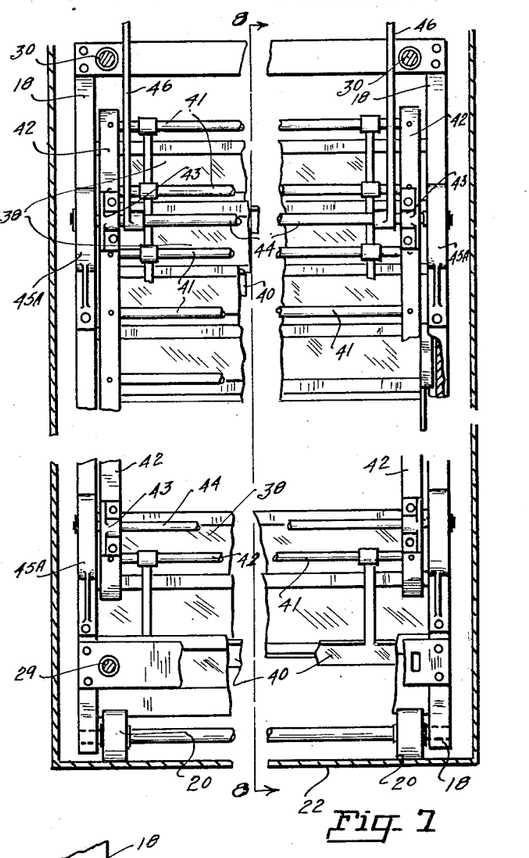
Fig. 7 is a rear side elevation, of the louvered and agitating elements, the same being taken on line 7—7 of Fig. 4, looking in the direction indicated.

I have found entirely satisfactory results may be obtained wherein a prime mover 136 disposed outside of the retort chamber is utilized for the pumping of the liquids from the storage tanks through the pipe 137 through the use of a suitable pumping element 138 driven by the prime mover 136 and distributed through the distributor pipe 139 into the header pipes 140 and 141 and be sprayed into the condensing chamber through nozzles 142 and 143, illustrated in Fig. 6. This material while of a heavy specific gravity when sprayed under fairly high pressures into the condensing chambers 117 and 119 may be made to successfully precipitate and scrub the volatile elements passing therethrough and precipitate those elements carried in suspension and be precipitated therefrom and be deposited into the liquid holding well disposed at the base of the condensing chamber. It is quite essential to know the temperatures developed within the condensing chambers and within the retort and this may be accomplished by the placing of thermal couples 144 and 145 at convenient locations within the condensing chambers and by the placing of thermal couples 146 and 147 and 148 within the retort itself; the temperature in each couple being reflected upon a graduated dial located at a convenient location for the inspection of the operator of the device, and electrical devices of any standard make may be used in indicating the temperatures within the respective chambers.

Figures 5, 12:
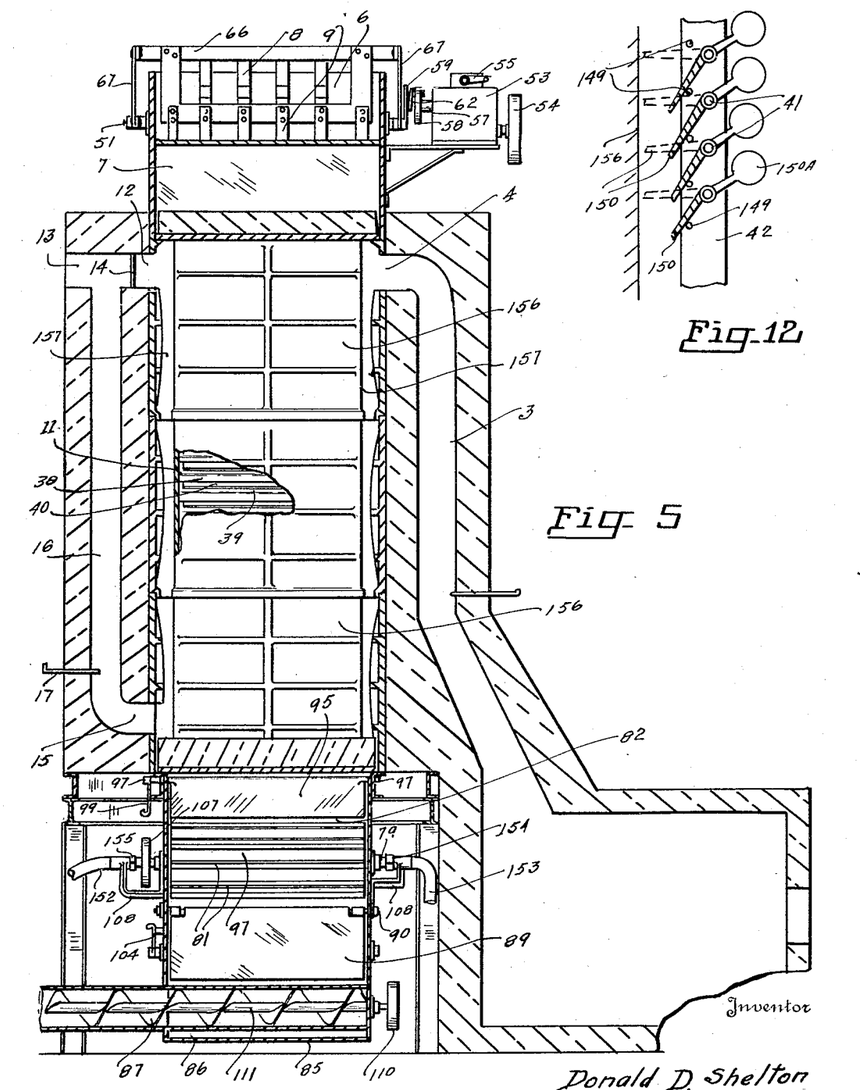
Fig. 5 is a longitudinal, section, side elevation of the assembled device, the same being taken on line 5—5 of Fig. 4, looking in the direction indicated.
Fig. 12 is a detail sectional view of a preferred embodiment of the furnace wall against the outer side of which the mass of material being treated flows.

I have illustrated in detail in Fig. 12, another preferred embodiment of my device wherein the agitating blades 40 are mounted within the secondary side wall frames and wherein the same are carried upon pins or supporting rods 149. This form of construction makes it possible for a greater lift to the outwardly disposed end 150 of the agitating blade.

It is highly desirable that the cooling drums 76 and 77 be cooled through a cooling medium being passed through the spaces 151 and 152, disposed the interior of the cooling drums. A cooling liquid, as water, being fed into one end of the drum through the inlet pipe 152 connected to a supply of liquid, not here shown, the same then being passed through the hollow journal shaft 78 and 79 and be released within the interior of the cooling drum 76 and 77. The same cooling medium may be released from the cooling drum and be carried away through the outlet or discharge pipe 153. Suitable stuffing boxes 154 and 155 are provided to prevent the escapement of the cooling liquids through the heads through which the supporting shaft 78 and 79 pass.

Where the depth of the stream of mass material is substantially large, I have found it necessary to make the side walls of the retort substantially as illustrated in Fig. 6, wherein the side walls 156 terminate in substantially right angle bends to form right angle side walls to permit a free passage of the heat supplying medium into the mass of material being treated. The heat must not only pass through the side walls 156, but may be permitted to pass, also through end walls 157 and 158 for a distance substantially as great as the maximum depth of the stream flow of material passing through the device. A second right angle bend is made in the side walls 157 and 158, as illustrated at 159 and 160, so that the total mass of material will be subjected to substantially uniform heat through the side and end walls of the retort. Seats 161 and 162 being provided within the end walls of the retort, into which the projecting ends 159 and 160 are made to engage.

Where a fuel of a specified requirement is to be made through the use of a device of this kind, the same may be made by the placing of a partition 163 within the feeding hopper and extending the same upward from the apex of the inverted V shaped bottom of the feeding hopper. Materials of different composition may then be fed into the feeding hopper from either side and the same be carbonized at either side of the retort. The resultant carbonized elements being deposited within the receiving station disposed at the oppositely disposed end of the retort. The feeding elements disposed within the feeding hopper being manipulated in alternate directions for the feeding of the material to be treated and the depositing of the same in a continuous stream at the receiving ends of the passageways. The fact that each of the passageways may be adjusted in depth independently of the other permits of the supplying of a stream mass of a quantity that may be completely carbonized in its passage through the retort.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. In a retort, a vertical passage way, provided with three walls adapted to be heated, a fourth wall composed of vertically spaced louvered plates, a movably supported plate riding upon each of said louvered plates, and means for moving the movably supported plates back and forth upon the louvered plates, each of the movably supported plates being spaced from one of the adjacent louvered plates and adapted to allow flow of gas therebetween.

2. In a retort, a vertical passage way provided with four walls forming a retort chamber, a heat chamber which provides said retort chamber with three of said walls, a louvered member forming the fourth wall of said retort, said louvered member providing upwardly and outwardly inclined gas off-take passages, such passageways each having spaced upper and lower oblique surfaces, a member movable in each of said gas off-take passages, the movable member moving in and out of said retort chamber and, when so moving, riding upon the lower oblique surface of the passageway.

3. In combination, a vertical retort chamber having a wall thereof provided with a plurality of oblique passageways therethrough, and agitating device operable in each of said passageways and adapted to move in and out of said retort chamber, said agitating device being arranged and adapted to move downwardly and into said chamber and upwardly and outwardly of said chamber.

4. In combination, a gravity retort chamber having a wall thereof composed of a plurality of spaced, obliquely disposed plates providing outwardly and upwardly inclined passageways therebetween, means for removing substances collecting upon the upper surfaces of each of said inclined plates, said means comprising members capable of being moved over the upper surfaces of said inclined plates, and means co-operating with each of said members, adapted for moving them in unison over the upper surfaces of their respective plates.

5. In a retort, a vertical passageway comprising four walls adapted to be subjected to heat upon three walls thereof, a louvered wall forming the fourth wall of said passageway, opposing one of the first mentioned walls, said louvered wall being capable of being moved towards and from the opposing wall, and including means for inducing such movement, a support for said louvered wall at the outer side thereof, with means for raising and lowering said support, means for causing said support to recede from the louvered wall, when raised, and to move towards said wall when lowered.

6. In a retort, a vertically elongated heat chamber, a combustion chamber, a passageway for conducting hot gases of combustion from the combustion chamber to the upper end of the heat chamber, a passageway communicating with the lower end of the heat chamber to conduct the gases therefrom, a retort chamber embodying a vertical passageway having three walls thereof constituting walls of the heat chamber, a fourth wall composed of vertically spaced louvered plates, a movably supported plate riding upon each of said louvered plates and means for moving the movable plates back and forth upon the louvered plates.

7. In a retort, a vertically elongated heat chamber, a combustion chamber, a passageway for conducting hot gases of combustion from the combustion chamber to the upper end of the heat chamber, a passageway communicating with the lower end of the heat chamber to conduct the gases of combustion away therefrom, a retort chamber embodying a vertical passageway having three walls thereof constituting a wall of the heat chamber, a fourth wall composed of vertically spaced louvered plates, a movable plate riding upon each of the louvered plates and mounted for entering and leaving the retort chamber and a vapor collecting chamber separated from the retort chamber by the said fourth wall and communicating with said retort chamber through said fourth wall.

8. In a retort, a vertical retort chamber having an inlet and an outlet at the top and bottom thereof, respectively, a plate disposed at an inclination, spaced below the outlet, said plate being mounted for rocking movement, another plate pivotally suspended at the outlet of said chamber, and spaced from the first mentioned plate to provide a passageway therebetween, means for angularly positioning of the last mentioned plate relative to the first mentioned plate, a rotary drum supporting one edge of the first mentioned plate, and a plurality of radially projecting blades spaced apart upon said drum and adapted to consecutively raise said first mentioned plate, as said drum rotates.

9. In a retort, a vertical retort chamber having an inlet and an outlet at the top and bottom thereof, respectively, a plate disposed at an inclination spaced below the outlet, said plate being mounted for rocking movement, another late pivotally suspended at the outlet of said chamber and spaced from the first mentioned plate to provide a passageway therebetween, means for angularly positioning the last mentioned plate relatively to the first mentioned plate, a rotary drum, supporting one edge of the first mentioned plate, a plurality of radially projecting blades spaced apart upon said drum adapted to consecutively raise said plate as said drum revolves, said drum having an interior chamber capable of receiving a cooling liquid and means for conducting such a liquid into said interior chamber.

DONALD D. SHELTON.